Patented Oct. 19, 1948

2,451,742

UNITED STATES PATENT OFFICE 2,451,742

PROCESS FOR THE MANUFACTURE OF ALDEHYDES

Herbert Lindlar, Basel, Switzerland, assignor to Hoffmann-La Roche Inc., Nutley, N. J., a corporation of New Jersey No Drawing. Application August 13, 1948, Serial No. 44,223. In Switzerland October 14, 1947

1 Claim. (Cl. 260—598)

The present invention relates to aldehydes and process for the manufacture thereof.

In my co-pending U. S. application Serial Number 753,379, filed June 7, 1947, it has been shown that an aldehyde may be obtained by condensing β-ionone with a halogeno acetic ester while avoiding application of high temperatures and treating the resulting condensation product with an alkaline agent.

According to my said co-pending application Serial No. 753,379 the aldehyde 4-(2',6',6'-trimethyl - cyclohexene-(1')-yl) -2-methyl - butene-(2)-al-(1) may be obtained in high yield and a comparatively pure form by condensing β-ionone with a halogeno acetic ester while avoiding application of high temperatures, treating the condensation product thus formed with an alkaline agent and isolating the aldehyde thus obtained. According to said application, β-ionone may be condensed either with a mono- or with a di-halogeno acetic ester. The chloro compounds are shown to be especially suitable for the reaction. In the synthesis shown in that application, β-ionone and a mono-halogen acetic ester are reacted in the presence of an alkaline agent, such as alkali alcoholate, an alkaline earth alcoholate or an alkali amide. Sodium alcoholate, preferably sodium methylate, is shown to be an especially advantageous condensing agent. The reaction may appropriately be carried out in the absence of a solvent, while using excess quantities of alcoholate and halogeno acetic ester. There is also shown the condensation of β-ionone and di-halogeno acetic ester in the usual manner with magnesium amalgam. The whole sequence of reactions is disclosed as carried out at a temperature not above 50° C.

It has now been found, according to the present invention, that the process of the above-cited co-pending application can be usefully applied to the manufacture of aldehydes from ketones having a constitution similar to that of β-ionone.

Accordingly, a process for the manufacture of aldehydes is provided, which comprises condensing a β-ionone-like ketone, namely an ionone other than β-ionone, with a halogeno acetic ester and reacting the condensation product with an alkaline agent, said process being entirely carried out at a temperature not in excess of 50° C.

The following ketones having a constitution similar to that of β-ionone may typically be used in the present process:

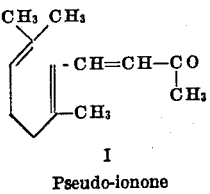

I
Pseudo-ionone

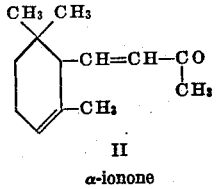

II
α-ionone

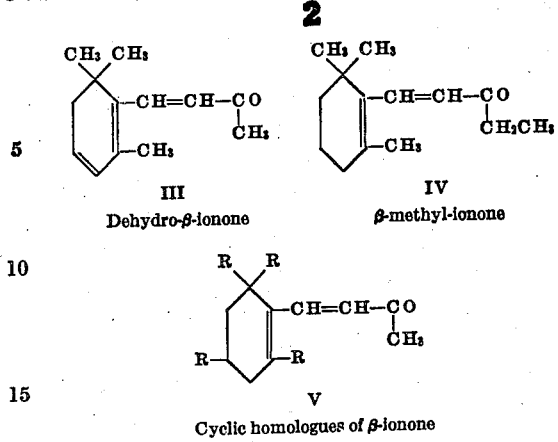

III
Dehydro-β-ionone

IV
β-methyl-ionone

V
Cyclic homologues of β-ionone wherein R may be hydrogen or a methyl radical.

Pseudo-ionone (I) and α-ionone (II) are known intermediates used in the perfume industry. Dehydro-β-ionone (III) is obtained in the usual manner by condensing 2,6,6-trimethylcyclohexadiene-(1,3)-al-(1) with acetone. It can also be produced by dehydrogenating β-ionone according to one of the usual dehydrogenation methods (Houben-Weyl, Methoden der organischen Chemie, vol. II, year 1925, Leipzig, pages 87–92). β-Methyl-ionones (IV) are obtained in accordance with German patent specifications Nos. 127,424, 133,758 and 150,827, whereas the cyclic homologues of the β-ionone (V) are produced from cyclohexanone or methylcyclohexanone by means of addition of the elements of acetylene, followed by dehydration, Grignard-condensation with acetic anhydride and partial dehydrogenation (Jones and Richardson, Congress of Pure and Applied Chemistry, London, Sec. 14, July 17, 1947).

The course of the reaction and the particular instructions to be followed correspond to those indicated in co-pending application Serial Number 753,379. The condensation of a said ketone similar to β-ionone is suitably carried out in the absence of a solvent, while employing an excess of alkali alcoholate and mono-halogeno acetic ester. The condensation must always be effected under mild conditions. It is advantageous not to isolate or purify the reaction product. During the whole sequence of reactions the temperature should not be allowed to rise above 50° C.

The aldehydes obtained in accordance with the present process are yellow oils which possess a double bond in α,β-position to the aldehyde group. They can be purified by means of distillation; they may further be characterized as phenyl-semicarbazone and thio-semicarbazone as well as by the ultra-violet absorption spectrum. The products obtained according to the present process are used as intermediates in the manufacture of compounds similar in structure to vitamin A.

Example 1

20 parts by weight of pseudo-ionone and 25 parts by weight of chloroacetic acid methyl ester are cooled to $-10°$ C. while stirring. 15 parts by weight of dry, pulverized sodium methylate are added in small portions. During this operation the reaction temperature is kept between 0 and $-5°$ C. After the last portion has been added, stirring is continued for 4 hours while cooling. 60 parts by volume of 15-per cent. solution of sodium hydroxide in methanol are then added and stirring is continued for further two hours. 90 parts of water are added and the mixture is extracted with ether; then the solvent is evaporated, and the mixture is fractionated in vacuo. 12 parts by weight of pure aldehyde of B. P. 10 mm. Hg 140–142° C. are obtained $n_D^{22}=1.508$.

The phenyl-semicarbazone melts at 147° C. and shows a depression of the melting point of more than 20° C. when mixed with the phenyl-semicarbazone of pseudo-ionone having the same melting point. The ultra-violet absorption spectrum shows an absorption maximum at 230 m$\mu$.

Example 2

20 parts by weight of $\alpha$-ionone are reacted with 26 parts by weight of mono-chloro-acetic acid ethyl ester and 13.5 parts by weight of pulverized sodium ethylate, as described in Example 1. The mixture is then saponified, diluted with water and—after allowing it to stand for several days—extracted with ether. The ether-fractions are worked up as described in Example 1. Thus $\alpha$-aldehyde is obtained in good yield. The product corresponds to the aldehyde described by I. M. Heilbron and his collaborators in the "Journal of the Chemical Society," London, year 1942, vol. II, page 732.

I claim:

Process which comprises condensing an ionone, other than $\beta$-ionone, and having the characteristic side chain

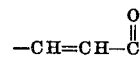

(lower alkyl) with a halogeno acetic ester, and reacting the condensation product with an alkaline agent to produce a corresponding butene-(2)-al-(1) having the characteristic corresponding side chain —CH$_2$—CH=C(lower alkyl)—CHO, said process being entirely carried out at a temperature not in excess of 50° C.

HERBERT LINDLAR.

No references cited.

Certificate of Correction

Patent No. 2,451,742.  October 19, 1948.

HERBERT LINDLAR

It is hereby certified that errors appear in the printed specification of the above numbered patent requiring correction as follows:

Column 4, lines 16 to 18 inclusive, for the formula

"$-CH=CH-\overset{O}{\underset{}{\overset{\|}{C}}}$"  read line 19, strike out "(lower alkyl)";

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*